(12) United States Patent
Oyobe et al.

(10) Patent No.: US 7,486,036 B2
(45) Date of Patent: Feb. 3, 2009

(54) POWER CONTROL APPARATUS, ELECTRICALLY POWERED VEHICLE AND POWER CONTROL METHOD OF POWER SYSTEM

(75) Inventors: Hichirosai Oyobe, Toyota (JP); Shoichi Sasaki, Mishima (JP); Makoto Nakamura, Okazaki (JP); Tetsuhiro Ishikawa, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 176 days.

(21) Appl. No.: 11/516,715

(22) Filed: Sep. 7, 2006

(65) Prior Publication Data

US 2007/0069673 A1  Mar. 29, 2007

(30) Foreign Application Priority Data

Sep. 29, 2005 (JP) ............................. 2005-285043

(51) Int. Cl.
*H02P 3/14* (2006.01)

(52) U.S. Cl. ................. 318/376; 318/375; 318/34; 318/63; 318/273; 318/362; 310/76; 310/92; 701/22; 180/65.3; 180/65.8; 320/104; 320/132; 324/427; 324/433

(58) Field of Classification Search ................ 318/376, 318/375, 34, 63, 273, 362, 803; 310/76, 310/92; 320/104, 132; 324/427, 433; 701/22; 180/65.3, 65.8

See application file for complete search history.

(56) References Cited

U.S. PATENT DOCUMENTS 4,595,880 A * 6/1986 Patil ........................... 324/427
5,099,186 A    3/1992 Rippel et al.
5,504,414 A * 4/1996 Kinoshita .................. 180/65.8
5,934,395 A * 8/1999 Koide et al. ................ 180/65.2
5,939,861 A * 8/1999 Joko et al. ................... 310/122
5,988,307 A * 11/1999 Yamada et al. ............. 180/243
6,131,680 A * 10/2000 Nii et al. ..................... 180/65.2
6,453,249 B1 * 9/2002 Shibutani et al. ............ 702/63
6,630,804 B2 * 10/2003 Moriya et al. ............... 318/85
6,812,670 B2 * 11/2004 Minamiura et al. .......... 320/116
6,856,866 B2 * 2/2005 Nakao ......................... 701/22
6,930,460 B2 * 8/2005 Ishikawa et al. ............. 318/442
7,074,157 B2 * 7/2006 Wakashiro et al. ............. 477/7
7,098,624 B2 * 8/2006 Kusaka ....................... 318/727
2002/0062183 A1 * 5/2002 Yamaguchi et al. .......... 701/22
2003/0146726 A1 * 8/2003 Ishikawa et al. ............. 318/442
2006/0076171 A1 * 4/2006 Donnelly et al. ............ 180/65.2
2008/0073135 A1 * 3/2008 Oyobe et al. ............... 180/65.4

FOREIGN PATENT DOCUMENTS

| JP | A 7-170611 | 7/1995 |
| JP | A 2002-218793 | 8/2002 |
| JP | A 2003-143897 | 5/2003 |
| JP | A 2004-142662 | 5/2004 |
| JP | A 2004-254465 | 9/2004 |

* cited by examiner

*Primary Examiner*—Rita Leykin
(74) *Attorney, Agent, or Firm*—Oliff & Berridge, PLC

(57) ABSTRACT

When surplus power not charged to an electric storage is generated at the time of regenerative braking of a vehicle, a voltage is generated across first and second neutral points using a zero-voltage vector each of first and second inverters and the generated surplus power is consumed by a resistance connected across the first and second neutral points. The voltage generated across the first and second neutral points is calculated in accordance with the surplus voltage, using a resistance value of the resistance.

20 Claims, 4 Drawing Sheets

POWER CONTROL APPARATUS, ELECTRICALLY POWERED VEHICLE AND POWER CONTROL METHOD OF POWER SYSTEM

This nonprovisional application is based on Japanese Patent Application No. 2005-285043 filed with the Japan Patent Office on Sep. 29, 2005, the entire contents of which are hereby incorporated by reference.

BACKGROUND OF THE INVENTION

1. Field of the Invention

The present invention relates to a power control apparatus and an electrically powered vehicle, and more specifically to power control at the time of regenerative braking of an electrically powered vehicle.

2. Description of the Background Art

In an electrically powered vehicle such as an electric vehicle or a hybrid vehicle that runs using a motor as a power source, at the time of braking of the vehicle, regenerative braking is generally done, in which the motor is rotated by the rotating force from the driving wheel to regenerate power, and the braking force corresponding to the regenerated power is used as the braking force of the vehicle.

When the vehicle is running on a long, downward slope at a high speed, for example, and the regenerated power increases to exceed an amount acceptable by a battery, an electric apparatus such as the battery or an inverter may be affected.

In view of the foregoing, Japanese Patent Laying-Open No. 2004-254465 discloses a regenerative braking apparatus in which surplus power generated at the time of regenerative braking is appropriately processed, to prevent adverse effect on the battery. In the regenerative braking apparatus, when surplus power is generated exceeding suitable charging power of the battery as a result of regenerative braking, a surplus power consuming load is selected from a plurality of electric loads in accordance with the magnitude of the surplus power, and the surplus power is consumed by the selected surplus power consuming load.

In the regenerative braking apparatus, the surplus power can be consumed without causing such problems that when the electric load to which the surplus power is to be cast off is already in operation and the surplus power cannot be used up, or that an electric load used only for consuming the surplus power must be provided. As a result, adverse effect on the battery can be prevented by a simple structure.

The regenerative braking apparatus disclosed in Japanese Patent Laying-Open No. 2004-254465, however, simply combines electric loads in accordance with the magnitude of surplus power, and it is impossible to successively control the amount of power consumption by the surplus power consuming loads in accordance with the magnitude of the surplus power. Therefore, it is still possible that the surplus power cannot sufficiently be used up, or excessive power might be wasted.

SUMMARY OF THE INVENTION

The present invention was made to solve the above-described problems and its object is to provide a power control apparatus that enables successive control of the amount of power consumption by an electric load, in accordance with the surplus power generated at the time of regenerative braking of a vehicle.

Another object of the present invention is to provide an electrically powered vehicle in which the amount of power consumption by the electric load can be controlled successively in accordance with the surplus power generated at the time of regenerative braking of a vehicle.

The present invention provides a power control apparatus, including: a first poly-phase AC electric motor including a star-connected first poly-phase winding as a stator winding; a second poly-phase AC electric motor including a star-connected second poly-phase winding as a stator winding; an electric storage charged by regenerative power generated by at least one of the first and second poly-phase AC electric motors; an electric load electrically connected between a first neutral point of the first poly-phase winding and a second neutral point of the second poly-phase winding; and a voltage control unit calculating surplus power not charged in the electric storage, of the regenerative power, and controlling a voltage across the first and second neutral points in accordance with the calculated surplus power.

According to the power control apparatus of the present invention, the electric load is connected between the first neutral point of the first poly-phase AC electric motor and the second neutral point of the second poly-phase AC electric motor. In accordance with the surplus power not charged to the electric storage, of the power regenerated by at least one of the first and second poly-phase AC electric motors, the voltage across the first and second neutral points is controlled, and the generated surplus power is consumed by the electric load.

Therefore, in the power control apparatus of the present invention, the amount of power consumption by the electric load can be controlled successively, in accordance with the surplus power. As a result, the generated surplus power can be consumed neither too much nor too little by the electric load.

Preferably, the voltage control unit calculates the surplus power not charged in the electric storage, of the regenerative power generated by at least one of the first and second poly-phase AC electric motors using kinetic energy of the vehicle at the time of a braking operation of the vehicle.

More preferably, the voltage control unit calculates the regenerative power based on the rotation number and reduction torque of the first and/or second poly-phase AC electric motor performing regeneration using kinetic energy of the vehicle.

More preferably, the voltage control unit calculates the surplus power based on power difference between the calculated regenerative power and the maximum charge power acceptable by the electric storage.

More preferably, the voltage control unit calculates a command value of a voltage to be generated across the first and second neutral points based on the calculated surplus power and the resistance value of the electric load, and controls the voltage across the first and second neutral points based on the calculated command voltage value.

Therefore, by the power control apparatus, the amount of power consumption by the electric load can be controlled successively, based on the resistance value of the electric load and on the surplus power generated at the time of regenerative braking.

Preferably, the power control apparatus further includes a connecting unit arranged between the electric load and the first and second neutral points, electrically connecting the first and second neutral points to the electric load in accordance with a command from the voltage control unit. The voltage control unit outputs the command to the connecting unit when the surplus power is generated.

In the power control apparatus, the electric load is electrically connected to the first and second neutral points only when the surplus power is generated. Therefore, unnecessary consumption of power by the electric load can be prevented when there is no surplus power generated.

Preferably, the voltage control unit generates a voltage difference in accordance with the surplus power across the first and second neutral points, when the surplus power is generated.

In the power control apparatus, voltage difference is generated across the first and second neutral points only when the surplus power is generated. Therefore, unnecessary consumption of power by the electric load can more reliably be prevented.

Further, the present invention provides an electrically powered vehicle, including: a first poly-phase AC electric motor including a star-connected first poly-phase winding as a stator winding; a second poly-phase AC electric motor including a star-connected second poly-phase winding as a stator winding; a driving wheel mechanically linked to a rotation shaft of the second poly-phase AC electric motor; an electric storage charged by regenerative power generated by at least one of the first and second poly-phase AC electric motors; an electric load electrically connected between a first neutral point of the first poly-phase winding and a second neutral point of the second poly-phase winding; and a voltage control unit for calculating surplus power not charged in the electric storage, of the regenerative power generated by the second poly-phase AC electric motor using kinetic energy of the vehicle at the time of a braking operation of the vehicle, and for controlling a voltage across the first and second neutral points in accordance with the calculated surplus power.

In the electrically powered vehicle in accordance with the present invention, the second poly-phase AC electric motor performs regenerative braking, receiving the rotational force from the driving wheel. Here, when the regeneration exceeding the maximum charge capacity of the electric storage takes place, surplus power results. In accordance with the surplus power, the voltage across the first and second neutral points is controlled, and the generated surplus power is consumed by the electric load.

Therefore, in accordance with the electrically powered vehicle of the present invention, the amount of power consumption by the electric load can be controlled successively, in accordance with the surplus power generated at the time of regenerative braking. As a result, the generated surplus power can be consumed neither too much nor too little by the electric load.

As described above, by the present invention, the voltage across the first and second neutral points to which the electric load is connected, is controlled in accordance with the surplus power generated at the time of regenerative braking of the vehicle. Thus, amount of power consumption by the electric load can be controlled successively, in accordance with the surplus power. As a result, the surplus power generated at the time of regenerative braking can be consumed neither too much nor too little by the electric load.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
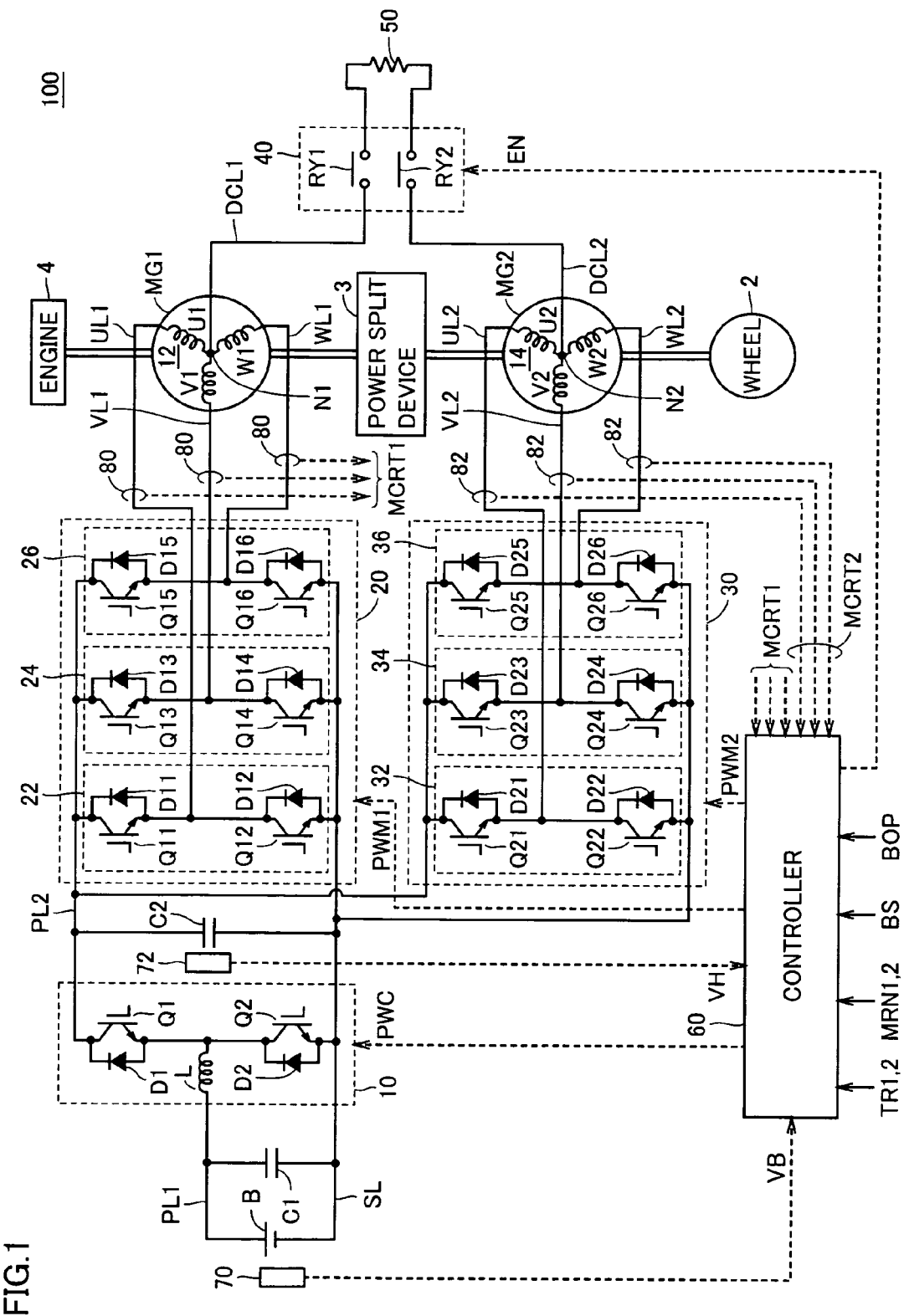
FIG. 1 is an overall block diagram of a hybrid vehicle shown as an example of an electrically powered vehicle in accordance with an embodiment of the present invention.

In the following, an embodiment of the present invention will be described in detail with reference to the figures. Throughout the figures, the same or corresponding portions are denoted by the same reference characters and description thereof will not be repeated.

FIG. 1 is an overall block diagram of a hybrid vehicle 100 shown as an example of the electrically powered vehicle in accordance with an embodiment of the present invention. Referring to FIG. 1, a hybrid vehicle 100 includes an engine 4, motor generators MG1 and MG2, a power split device 3 and wheels 2. Further, hybrid vehicle 100 includes an electric storage B, a boost converter 10, inverters 20 and 30, a controller 60, capacitors C1 and C2, power lines PL1 and PL2, a ground line SL, U-phase lines UL1 and UL2, V-phase lines VL1 and VL2, W-phase lines WL and WL2, voltage sensors 70 and 72, and current sensors 80 and 82. Hybrid vehicle 100 further includes power lines DCL1 and DCL2, a relay circuit 40 and a resistance 50.

Hybrid vehicle 100 runs using engine 4 and motor generator MG2 as power sources. Power split device 3 is linked to engine 4 and to motor generators MG1 and MG2, and distributes power among these. By way of example, a planetary gear having three rotation shafts of a sun gear, a planetary carrier and a ring gear may be used as the power split device 3. These three shafts of rotation are respectively linked to respective rotation shafts of engine 4 and motor generators MG1 and MG2. For instance, it is possible to mechanically link engine 4 and motor generators MG1 and MG2 to power split device 3 by making the rotor of motor generator MG1 hollow and passing a crank shaft of engine 4 through the center thereof The rotation shaft of motor generator MG2 is linked to wheel 2 by means of a reduction gear or a running gear, not shown. A reducer for the rotation shaft of motor generator MG2 may additionally be incorporated inside the power split device 3.

Motor generator MG1 is incorporated in the hybrid vehicle 100, operating as a generator driven by engine 4 and as a motor that can start the operation of engine 4. Motor generator MG2 is incorporated in hybrid vehicle 100 as a motor driving wheel 2.

Electric storage B has its positive electrode connected to power line PL1 and its negative electrode connected to ground line SL. Capacitor C1 is connected between power line PL1 and ground line SL.

Boost converter 10 includes a reactor L, npn transistors Q1 and Q2, and diodes D1 and D2. The npn transistors Q1 and Q2 are connected in series between power line PL2 and ground line SL. Between the collector and emitter of npn transistors Q1 and Q2, diodes D1 and D2 are connected, respectively, to cause a current flow from the emitter side to the collector side. Reactor L has one end connected to a node between npn transistors Q1 and Q2, and the other end connected to power line PL1.

As the above-described npn transistors and other npn transistors that will be described later in the specification, an IGBT (Insulated Gate Bipolar Transistor) may be used. Further, in place of the npn transistor, a power switching element such as a power MOSFET (Metal Oxide Semiconductor Field-Effect Transistor) may be used.

Capacitor C2 is connected between power line PL2 and ground line SL. Inverter 20 includes a U-phase arm 22, a V-phase arm 24 and a W-phase arm 26. U-phase arm 22, V-phase arm 24 and W-phase arm 26 are connected in parallel between power line PL2 and ground line SL. U-phase arm 22 consists of series-connected npn transistors Q11 and Q12, V-phase arm 24 consists of series-connected npn transistors Q13 and Q14, and W-phase arm 26 consists of series-connected npn transistors Q15 and Q16. Between the collector and emitter of npn transistors Q11 to Q16, diodes D11 to D16 are connected, respectively, to cause current flow from the emitter side to the collector side.

Motor generator MG1 includes a three-phase coil 12 as a stator coil. U-phase coil U1, V-phase coil V1 and W-phase coil W1 forming the three-phase coil 12 have one end connected together to form a neutral point N1, and U-phase coil U1, V-phase coil V1 and W-phase coil W1 have the other end connected to respective nodes between upper and lower arms of U-phase arm 22, V-phase arm 24 and W-phase arm 26 of inverter 20, respectively.

Inverter 30 includes a U-phase arm 32, a V-phase arm 34 and a W-phase arm 36. Motor generator MG2 includes a three-phase coil 14 as a stator coil. Inverter 30 and motor generator MG2 have the same structures as inverter 20 and motor generator MG1, respectively.

Relay circuit 40 includes relays RY1 and RY2. One end of power line DCL1 is connected to neutral point N1, and the other end is connected to one end of relay RY1. Further, one end of power line DCL2 is connected to neutral point N2, and the other end is connected to one end of relay RY2. Further, one end of resistance 50 is connected to the other end of relay RY1, and the other end of resistance 50 is connected to the other end of relay RY2.

Electric storage B is a rechargeable DC power source, such as a nickel hydride or lithium ion secondary battery. Electric storage B outputs DC power to boost converter 10. Further, electric storage B is charged by boost converter 10. It is noted that a large capacity capacitor may be used as electric storage B.

Voltage sensor 70 detects voltage VB of electric storage B, and outputs the detected voltage VB to controller 60. Capacitor C1 smoothes voltage variation between power supply line PL1 and ground line SL.

In accordance with a signal PWC from controller 60, boost converter 10 boosts the DC voltage received from electric storage B using reactor L, and supplies the boosted voltage to power line PL2. Specifically, in accordance with the signal PWC from controller 60, boost converter 10 accumulates the current that flows in accordance with the switching operation of npn transistor Q2 as magnetic field energy in reactor L, thereby boosting the DC voltage from electric storage B. Then, boost converter 10 outputs the boosted voltage through diode D1 to power line PL2 in synchronization with the off-timing of npn transistor Q2. Further, boost converter 10 lowers the DC voltage supplied from power line PL2 to charge electric storage B, in accordance with the signal PWC from controller 60.

Capacitor C2 smoothes voltage variation between power supply line PL2 and ground line SL. Voltage sensor 72 detects voltage across terminals of capacitor C2, that is, voltage VH of power line PL2 with respect to ground line SL, and outputs the detected voltage VH to controller 60.

In accordance with a signal PWM1 from controller 60, inverter 20 converts the DC voltage received from power line PL2 to a three-phase AC voltage, and outputs the converted three-phase AC voltage to motor generator MG1. Further, inverter 20 converts to a DC voltage, three-phase AC voltage generated by motor generator MG1 receiving power from engine 4 in accordance with the signal PWM1 from controller 60, and outputs the converted DC voltage to power line PL2.

In accordance with a signal PWM2 from controller 60, inverter 30 converts the DC voltage received from power line PL2 to a three-phase AC voltage, and outputs the converted three-phase AC voltage to motor generator MG2. Further, inverter 30 converts to a DC voltage, three-phase AC voltage generated by motor generator MG2 receiving rotational force of wheel 2 at the time of regenerative braking of the vehicle, in accordance with the signal PWM2 from controller 60, and outputs the converted DC voltage to power line PL2.

Here, when the regenerative power not charged to electric storage B is generated by motor generator MG2 during regenerative braking of the vehicle, inverters 20 and 30 generate a voltage across neutral points N1 and N2, based on signals PWM1 and PWM2 from controller 60, respectively. Specifically, when regenerative power exceeding the maximum charge power of electric storage B (hereinafter, the excessive power will also be referred to as "surplus power") is generated by motor generator MG2 during regenerative braking of the vehicle, a voltage in accordance with the surplus power is generated across neutral points N1 and N2, so that the surplus power is consumed by resistance 50 connected across neutrals points N1 and N2.

Each of motor generators MG1 and MG2 is a three-phase AC electric motor, implemented, for example, by an IPM (Interior Permanent Magnet) type three-phase AC synchronous motor. Motor generator MG1 is linked to engine 4, generates a three-phase AC voltage using power of engine 4, and outputs the generated three-phase AC voltage to inverter 20. Further, motor generator MG1 generates driving force by the three-phase AC voltage received from inverter 20, and starts engine 4. Motor generator MG2 is linked to wheel 2 of the vehicle, and generates a vehicle driving torque by the three-phase AC voltage received from inverter 30. Further, motor generator MG2 generates a three-phase AC voltage and outputs the voltage to inverter 30, at the time of regenerative braking of the vehicle.

Relays RY1 and RY2 of relay circuit 40 connect/disconnect power lines DCL1 and DCL2 to/from resistance 50. Receiving the output permission command EN from controller 60, relay circuit 40 turns relays RY1 and RY2 on, and electrically connects power lines DCL1 and DCL2 to resistance 50.

Resistance 50 consumes power applied from neutral points N1 and N2 of motor generators MG1 and MG2 through power lines DCL1 and DCL2, when surplus power is generated at the time of regenerative braking of the vehicle. As the resistance 50, a heater, for example, may be used.

Current sensor 80 detects a motor current MCRT1 flowing through motor generator MG1, and outputs the detected motor current MCRT1 to controller 60. Current sensor 82 detects a motor current MCRT2 flowing through motor generator MG2, and outputs the detected motor current MCRT2 to controller 60.

Based on torque control values TR1 and TR2 and motor rotation numbers MRN1 and MRN2 of motor generators MG1 and MG2 output from an ECU (Electronic Control Unit), not shown, a voltage VB from voltage sensor 70 and a voltage VH from voltage sensor 72, controller 60 generates the signal PWC for driving boost converter 10, and outputs the generated signal PWC to boost converter 10.

Further, based on the voltage VH, torque control value TR1 of motor generator MG1 and motor current MCRT1 from current sensor 80, controller 60 generates a signal PWM1 for driving motor generator MG1, and outputs the generated signal PWM1 to inverter 20. Further, based on voltage VH, torque control value TR2 of motor generator MG2 and motor current MCRT2 from current sensor 82, controller 60 generates a signal PWM2 for driving motor generator MG2, and outputs the generated signal PWM2 to inverter 30.

Further, controller 60 receives a signal BS from a brake switch (not shown, same in the following), and receives a signal BOP representing the amount of operation of brake pedal from a sensor (not shown, same in the following) detecting the amount of operation of the brake pedal (amount of stepping on the pedal). Receiving the signal BS at the H (logic high) level indicating that the brake pedal is operated by the driver, controller 60 determines whether surplus power would be generated or not by the regenerative braking, by motor generator MG2. If it is determined that surplus power will be generated, controller 60 generates a command voltage to generate, across neutral points N1 and N2, a voltage necessary for consuming the surplus power by resistance 50, and using the command voltage, generates signals PWM1 and PWM2 for inverters 20 and 30. Further, receiving the signal BS at the H level, controller 60 outputs an output permission command EN to relay circuit 40.

Figure 2:
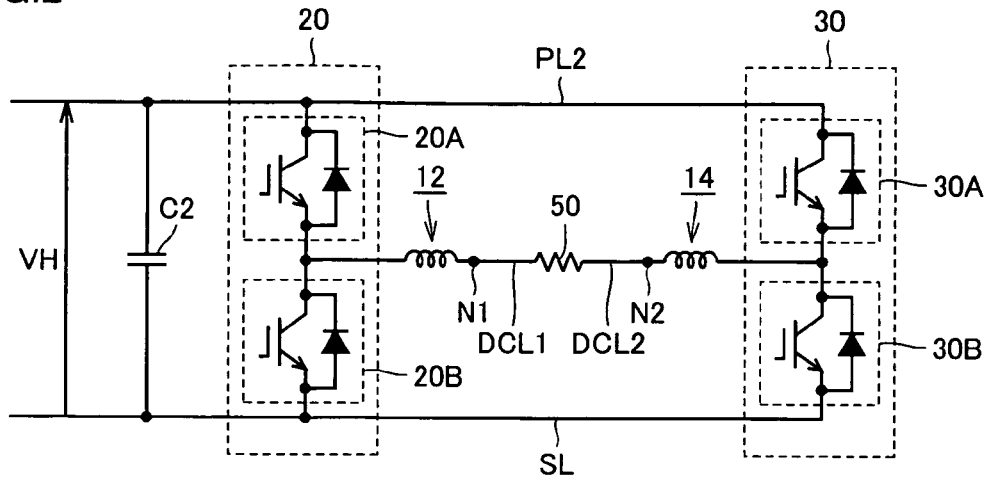
FIG. 2 is a circuit diagram representing a zero-phase equivalent circuit of inverters and motor generators shown in FIG. 1.

FIG. 2 shows a zero-phase equivalent circuit of inverters 20 and 30 and motor generators MG1 and MG2 shown in FIG. 1. Referring to FIG. 2, in each of inverters 20 and 30 as three-phase inverters, there are eight different combination patterns of on/off of six npn transistors. In two of the eight switching patterns, interphase voltages attain to zero, and such voltage state is referred to as "zero-voltage vector." For the zero-voltage vector, three transistors corresponding to the upper arm can be regarded as in the same switching state (all on, or all off), and three transistors corresponding to the lower arm can also be regarded as in the same switching state. Therefore, in FIG. 2, npn transistors Q11, Q13 and Q15 of inverter 20 are generally represented as upper arm 20A, and npn transistors Q12, Q14 and Q16 of inverter 20 are generally represented as lower arm 20B. Similarly, npn transistors Q21, Q23 and Q25 of inverter 30 are generally represented as upper arm 30A, and npn transistors Q22, Q24 and Q26 of inverter 30 are generally represented as lower arm 30B.

Using the zero-voltage vector, in each of inverters 20 and 30, it is possible to control the potential of the corresponding neutral point, without changing the d-axis and q-axis current of the corresponding motor generator, that is, without causing any influence to the torque control of the motor generator.

Therefore, when the surplus power not charged to electric storage B is generated at the time of regenerative braking of the vehicle, a voltage difference is generated across neutral points N1 and N2 using the zero-voltage vector of each of inverters 20 and 30, and the generated surplus power is consumed by resistance 50 connected across neutral points N1 and N2. The voltage difference generated across neutral points N1 and N2 is calculated in accordance with the surplus power, using the resistance value of resistance 50. Accordingly, the generated surplus power can be consumed neither too much nor too little by resistance 50 without causing any influence to regenerative torque control by motor generator MG2, that is, while maintaining the regenerative braking force by motor generator MG2.

Figure 3:
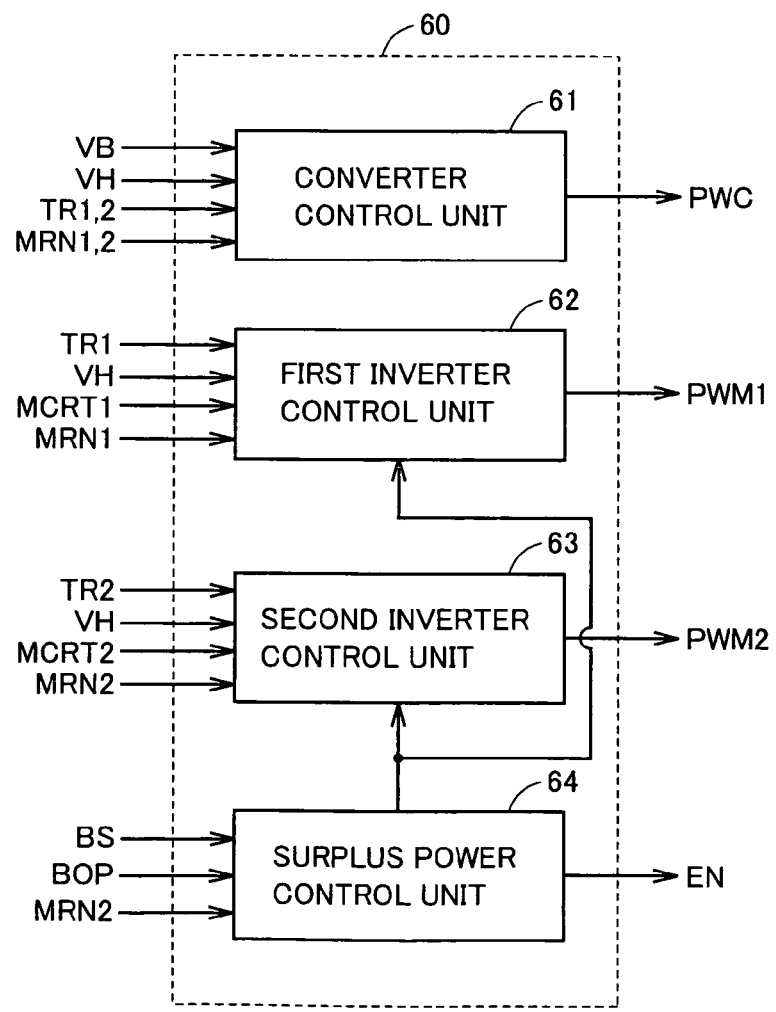
FIG. 3 is a functional block diagram of the controller shown in FIG. 1.

FIG. 3 is a functional block diagram of controller 60 shown in FIG. 1. Referring to FIG. 3, controller 60 includes a converter control unit 61, a first inverter control unit 62, a second inverter control unit 63, and a surplus power control unit 64. Converter control unit 61 generates, based on voltage VB from voltage sensor 70, voltage VH from voltage sensor 72, torque control values TR1 and TR2 and motor rotation numbers MRN1 and MRN2, the signal PWC for turning on/off the npn transistors Q1 and Q2 of boost converter 10, and outputs the generated signal PWC to boost converter 10.

The first inverter control unit 62 generates, based on torque control value TR1, motor current MCRT1 and motor rotation number MRN1 of motor generator MG1 and on voltage VH, the signal PWM1 for turning on/off the npn transistors Q11 to Q16 of inverter 20, and outputs the generated signal PWM1 to inverter 20.

The second inverter control unit 63 generates, based on torque control value TR2, motor current MCRT2 and motor rotation number MRN2 of motor generator MG2 and on voltage VH, the signal PWM2 for turning on/off the npn transistors Q21 to Q26 of inverter 30, and outputs the generated signal PWM2 to inverter 30.

Here, receiving the command voltage value for generating the voltage in accordance with the surplus power across neutral points N1 and N2 from surplus power control unit 64, first and second inverter control units 62 and 63 generate signals PWM1 and PWM2 with changing the zero-voltage vectors of inverters 20 and 30, respectively.

Based on the signal BS from the brake switch, the signal BOP from the sensor detecting the amount of operation of the brake pedal and on the motor rotation number MRN2 of motor generator MG2, surplus power control unit 64 calculates the surplus power generated during the regenerative braking by motor generator MG2, and based on the surplus power and the resistance value of resistance 50, generates a command voltage value for generating a voltage across neutral points N1 and N2. Then, surplus power control unit 64 outputs the command voltage value to the first and second inverter control units 62 and 63. Further, when the surplus power is generated, surplus power control unit 64 outputs the output permission command EN to relay circuit 40.

Figure 4:
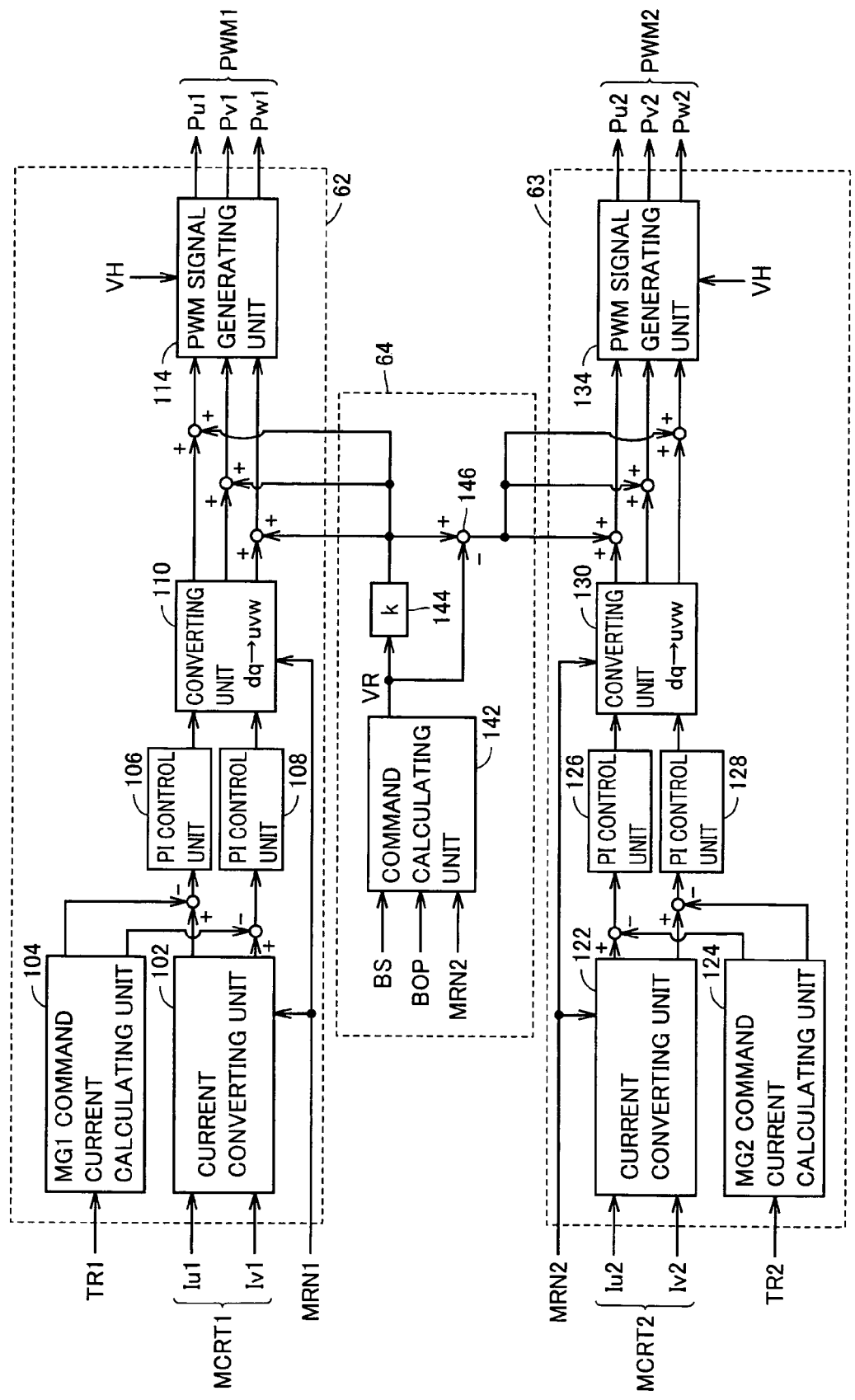
FIG. 4 is a detailed functional block diagram of the first and second inverter control units and a surplus power control unit shown in FIG. 3.

FIG. 4 is a detailed functional block diagram of the first and second inverter control units 62 and 63 and surplus power control unit 64, shown in FIG. 3. Referring to FIG. 4, the first inverter control unit 62 includes a current converting unit 102, an MG1 command current calculating unit 104, PI control units 106 and 108, a converting unit 110, and a PWM signal generating unit 114.

Current converting unit 102 converts, using the motor rotation number MRN1 of motor generator MG1, a U-phase current Iu1 and a V-phase current Iv1 detected by current sensor 80 to a d-axis current Id1 and a q-axis current Iq1. MG1 command current calculating unit 104 calculates, based on the torque control value TR1 of motor generator MG1, command currents Id1$r$ and Iq1$r$ of motor generator MG1 on the d- and q-axes.

PI control unit 106 receives a deviation between the d-axis current Id1 from current converting unit 102 and the command current Id1$r$ from MG1 command current calculating unit 104, performs a proportional-plus-integral operation using the deviation as an input, and outputs the result of operation to converting unit 110. PI control unit 108 receives a deviation between the q-axis current Iq1 from current converting unit 102 and the command current Iq1$r$ from MG1 command current calculating unit 104, performs a proportional-plus-integral operation using the deviation as an input, and outputs the result of operation to converting unit 110.

Using motor rotation number MRN1, converting unit 110 converts the command voltages on the d- and q-axes received from PI control units 106 and 108, respectively, to U, V and W-phase command voltages for motor generator MG1.

PWM signal generating unit 114 generates, based on the voltage VH from voltage sensor 72 and on command voltages obtained by superposing the command voltage value from surplus power control unit 64 on U, V and W phase command voltages, respectively, from converting unit 110, PWM signals Pu1, Pv1 and Pw1 corresponding to inverter 20, and outputs the generated signals Pu1, Pv1 and Pw1 as the signal PWM1, to inverter 20.

Here, superposing the command voltage value from surplus power control unit 64 uniformly on U, V and W phase command voltages for motor generator MG1 from converting unit 110 corresponds to changing zero-voltage vector of inverter 20 based on the command voltage value from surplus power control unit 64.

The second inverter control unit 63 includes a current converting unit 122, an MG2 command current calculating unit 124, PI control units 126 and 128, a converting unit 130 and a PWM signal generating unit 134. Current converting unit 122 converts, using the motor rotation number MRN2 of motor generator MG2, a U-phase current Iu2 and a V-phase current Iv2 detected by current sensor 82 to a d-axis current Id2 and a q-axis current Iq2. MG2 command current calculating unit 124 calculates, based on the torque control value TR2 of motor generator MG2, command currents Id2r and Iq2r of motor generator MG2 on the d- and q-axes.

PI control unit 126 receives a deviation between the d-axis current Id2 from current converting unit 122 and the command current Id2r from MG2 command current calculating unit 124, performs a proportional-plus-integral operation using the deviation as an input, and outputs the result of operation to converting unit 130. PI control unit 128 receives a deviation between the q-axis current Iq2 from current converting unit 122 and the command current Iq2r from MG2 command current calculating unit 124, performs a proportional-plus-integral operation using the deviation as an input, and outputs the result of operation to converting unit 130.

Using motor rotation number MRN2, converting unit 130 converts the command voltages on the d- and q-axes received from PI control units 126 and 128, respectively, to U, V and W-phase command voltages for motor generator MG2.

PWM signal generating unit 134 generates, based on the voltage VH and on command voltages obtained by superposing the command voltage value from surplus power control unit 64 on respective phase command voltages for motor generator MG2 from converting unit 130, PWM signals Pu2, Pv2 and Pw2 corresponding to inverter 30, and outputs the generated signals Pu2, Pv2 and Pw2 as the signal PWM2, to inverter 30.

Here, superposing the command voltage value from surplus power control unit 64 uniformly on U, V and W phase command voltages for motor generator MG2 from converting unit 130 corresponds to changing zero-voltage vector of inverter 30 based on the command voltage value from surplus power control unit 64.

Surplus power control unit 64 includes a command calculating unit 142, a multiplication unit 144 and a subtraction unit 146. Command calculating unit 142 generates a command voltage value VR for generating the voltage across neutral points N1 and N2 based on the signals BS and BOP and on motor rotation number MRN2, in the manner as will be described later.

Multiplication unit 144 multiplies by k (k is a constant of at least 0 and at most 1) the command voltage value VR from command calculating unit 142, and outputs the result of operation to the first inverter control unit 62. Subtracting unit 146 subtracts the command voltage value VR from the output value of multiplication unit 144, and outputs the result of operation to the second inverter control unit 63.

Specifically, the command voltage value VR calculated by command calculating unit 142 is multiplied by k and output to the first inverter control unit 62, and multiplied by—(1−k) and output to the second inverter control unit 63. Specifically, the value k represents the voltage burden ratio of inverters 20 and 30 when the voltage corresponding to the command voltage value VR is to be generated across neutral points N1 and N2, and when the value k exceeds 0.5, the voltage burden on inverter 20 becomes large and when k is smaller than 0.5, the voltage burden on inverter 30 becomes large.

Motor generator MG2 performs regenerative torque control for generating the braking force, and therefore, at the time of generating the voltage across neutral points N1 and N2, smaller voltage burden on inverter 30 is desired. On the other hand, when the surplus power is generated, power generation by motor generator MG1 is stopped, and therefore, at the time of generating the voltage across neutral points N1 and N2, inverter 20 may bear a large voltage burden. Therefore, the burden of generating the voltage across the neutral points N1 and N2 may be fully borne by inverter 20, by setting the value k to 1.

Surplus power control unit 64 sets the command voltage value VR to 0 when it receives the signal BS at the L (logic low) level or when there is no surplus power. Therefore, the command voltage value output from surplus power control unit 64 to the first and second inverter control units 62 and 63 is 0.

Figure 5:
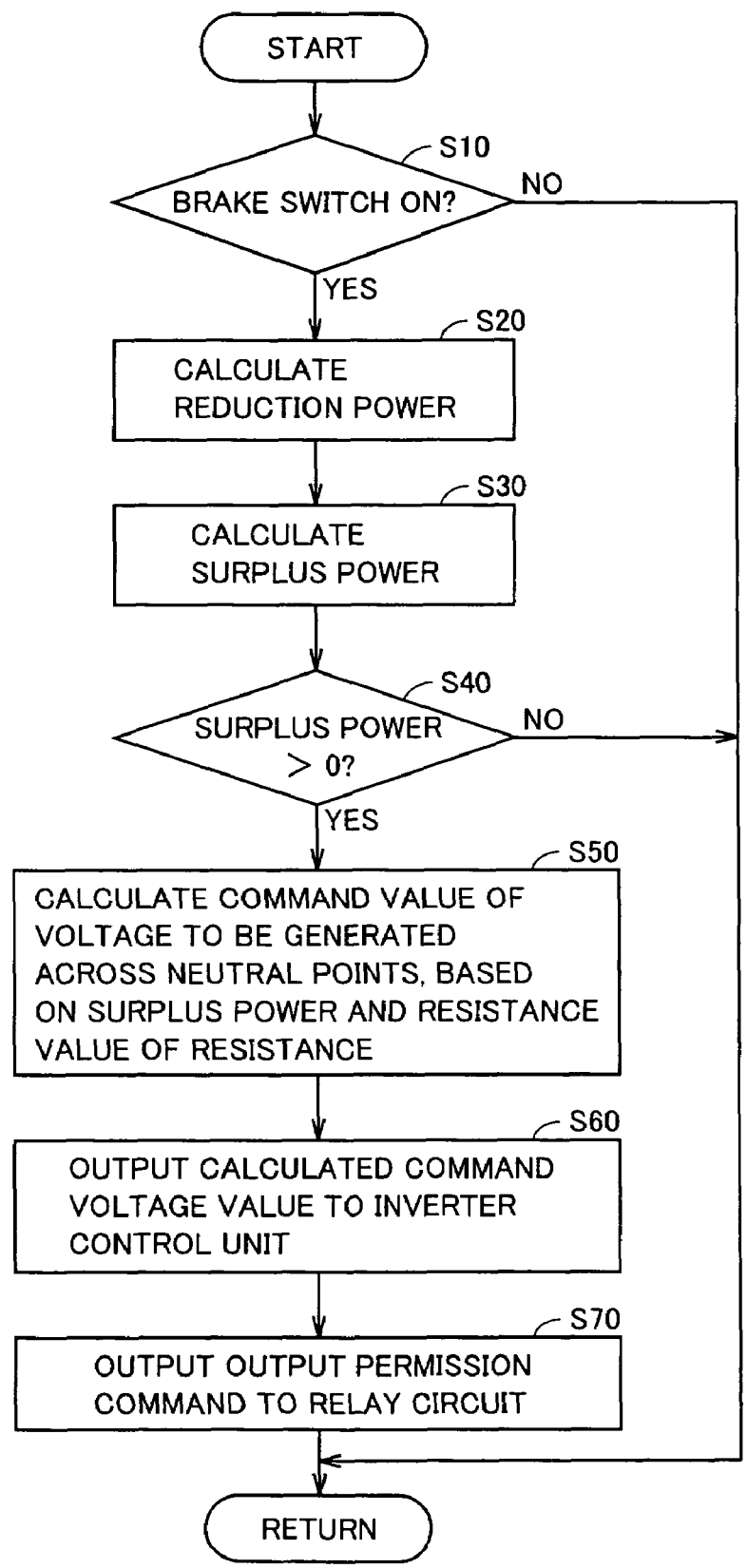
FIG. 5 is a flowchart representing a control structure of the process performed by the surplus power control unit shown in FIGS. 3 and 4.

FIG. 5 is a flowchart representing a control structure of a process performed by surplus power control unit 64 shown in FIGS. 3 and 4. The process of the flowchart is called from the main routine of controller 60 and executed at every prescribed time period or every time prescribed conditions are satisfied.

Referring to FIG. 5, surplus power control unit 64 determines whether the brake switch is ON or not, based on the signal BS (step S10). When the signal BS is at the L level and it is determined that the brake switch is OFF (NO at step S10), surplus power control unit 64 ends the operation and the control is returned to the main routine.

When the signal BS is at the H level and it is determined that the brake switch is ON (YES at step S10), surplus power control unit 64 calculates the regenerative braking torque TG generated by motor generator MG2, based on the signal BOP from the sensor detecting the amount of operation of the brake pedal. Then, surplus power control unit 64 multiplies the regenerative braking torque TG by the rotation number MRN2 of motor generator MG2, to calculate the reduction power WG generated by motor generator MG2 (step S20). Here, the reduction power WG corresponds to the regenerative power generated by motor generator MG2 along the regenerative braking.

Thereafter, surplus voltage control unit 64 calculates maximum charge power Win of electric storage B based on the state of charge (SOC) and temperature of electric storage B. Qualitatively, the maximum charge power Win becomes larger when SOC of electric storage B is lower, and it becomes smaller when the temperature of electric storage B is lowered or raised. Then, surplus power control unit 64 subtracts the calculated maximum charge power Win of electric storage B from reduction power WG calculated at step S20, to calculate the surplus power ΔW (step S30).

When the calculated surplus power ΔW is 0 or smaller (NO at step S40), surplus power control unit 64 determines that surplus power is not generated and ends the series of operations, and the control is returned to the main routine.

When the calculated surplus power ΔW is larger than 0 (YES at step S40), surplus power control unit 64 calculates the voltage to be generated across neutral points N1 and N2, in accordance with the surplus power ΔW (step S50). Specifically, surplus power control unit 64 calculates the voltage V to be generated across neutral points N1 and N2 in accordance with the equation below, using the resistance value R of resistance 50, assuming that the surplus power ΔW is fully consumed by resistance 50.

Surplus power $\Delta W = V^2/R$

Then, surplus power control unit 64 outputs the voltage V calculated in accordance with the equation above as command voltage value VR to the first and second inverter control units 62 and 63 (step S60), and outputs an output permission command EN to relay circuit 40 (step S70).

As described above, according to the present embodiment, resistance 50 is connected across neutral points N1 and N2 of motor generators MG1 and MG2, and the surplus power ΔW generated at the time of regenerative braking of hybrid vehicle 100 is consumed by resistance 50. As the voltage generated across neutral points N1 and N2 is controlled in accordance with the generated surplus power ΔW, the amount of power consumption by resistance 50 can be controlled successively in accordance with the surplus power ΔW. Therefore, the surplus power ΔW can be consumed neither too much nor too little by resistance 50, and adverse effect to electric storage B or inverters 20 and 30 can be prevented.

Further, as the voltage to cause resistance 50 to consume surplus power ΔW is generated by controlling the zero-voltage vectors of inverters 20 and 30, the regenerative torque control of motor generator MG2 is not influenced. Therefore, the surplus power ΔW can be consumed by resistance 50 without affecting the braking force of motor generator MG2.

Further, it is unnecessary to separately provide a dedicated converter to generate the voltage to be applied to resistance 50 for consuming the surplus power ΔW. Therefore, reduction in weight or size of the vehicle is not hindered.

In the embodiment above, a hybrid vehicle in which engine 4 and motor generator MG2 are used as power sources has been described as an example of the electrically powered vehicle. The present invention may be applicable also to a fuel-cell vehicle or an electric vehicle mounting at least two motor generators. Further, the present invention is generally applicable to an electrically powered vehicle mounting at least two motor generators. When the electrically powered vehicle of the present invention is implemented as an electric vehicle or a fuel-cell vehicle, motor generators MG1 and MG2 are linked to the driving wheel of the electric vehicle or the fuel-cell vehicle.

In the embodiment above, regenerative braking is done by motor generator MG2 linked to wheel 2 at the time of a braking operation of the vehicle. In an electrically powered vehicle having two motor generators both linked to wheels, regenerative braking may be performed by two motor generators at the time of a braking operation of the vehicle.

Though resistance 50 is implemented as a heater in the embodiment above, it may have other usage. In place of resistance 50, other vehicle load having a known resistance value may be used.

Though hybrid vehicle 100 includes a boost converter 10 in the embodiment above, the present invention is applicable also to hybrid vehicle 100 or other electrically powered vehicle not including boost converter 10.

In the foregoing, motor generators MG1 and MG2 correspond to "the first poly-phase AC electric motor" and "the second poly-phase AC electric motor," and three-phase coils 12 and 14 correspond to "the first poly-phase winding" and "the second poly-phase winding" of the present invention, respectively. Resistance 50 corresponds to "the electric load" of the present invention, and inverters 20 and 30, motor generators MG1 and MG2 and controller 60 constitute "the voltage control unit" of the present invention. Further, relay circuit 40 corresponds to "the connecting unit", and wheel 2 corresponds to "the driving wheel" of the present invention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A power control apparatus, comprising:
 a first poly-phase AC electric motor including a star-connected first poly-phase winding as a stator winding;
 a second poly-phase AC electric motor including a star-connected second poly-phase winding as a stator winding;
 an electric storage charged by regenerative power generated by at least one of said first and second poly-phase AC electric motors;
 an electric load electrically connected between a first neutral point of said first poly-phase winding and a second neutral point of said second poly-phase winding; and
 voltage control means for calculating surplus power corresponding to remainder obtained by subtracting power charged in said electric storage from said regenerative power, and for controlling a voltage across said first and second neutral points in accordance with the calculated surplus power.

2. The power control apparatus according to claim 1, wherein
 the power control apparatus is mounted on a vehicle,
 said voltage control means calculates the surplus power corresponding to remainder obtained by subtracting power charged in said electric storage from said regenerative power generated by at least one of said first and second poly-phase AC electric motors using kinetic energy of said vehicle at the time of a braking operation of said vehicle.

3. The power control apparatus according to claim 2, wherein
 said voltage control means calculates said regenerative power based on rotation number and reduction torque of the poly-phase AC electric motor performing regeneration using kinetic energy of the vehicle.

4. The power control apparatus according to claim 3, wherein
 said voltage control means calculates said surplus power based on power difference between said calculated regenerative power and maximum charge power acceptable by said electric storage.

5. The power control apparatus according to claim 1, wherein
 said voltage control means calculates a command value of a voltage to be generated across said first and second neutral points based on said calculated surplus power and a resistance value of said electric load, and controls the voltage across said first and second neutral points based on the calculated command voltage value.

6. The power control apparatus according to claim 1, further comprising
 a connecting unit arranged between said electric load and said first and second neutral points, electrically connecting said first and second neutral points to said electric load in accordance with a command from said voltage control means; wherein said voltage control means outputs said command to said connecting unit when said surplus power is generated.

7. The power control apparatus according to claim 1, wherein said voltage control means generates a voltage difference in accordance with said surplus power across said first and second neutral points, when said surplus power is generated.

8. An electrically powered vehicle, comprising:
a first poly-phase AC electric motor including a star-connected first poly-phase winding as a stator winding;
a second poly-phase AC electric motor including a star-connected second poly-phase winding as a stator winding;
a driving wheel mechanically linked to a rotation shaft of said second poly-phase AC electric motor;
an electric storage charged by regenerative power generated by at least one of said first and second poly-phase AC electric motors;
an electric load electrically connected between a first neutral point of said first poly-phase winding and a second neutral point of said second poly-phase winding; and
voltage control means for calculating surplus power corresponding to remainder obtained by subtracting power charged in said electric storage from said regenerative power generated by said second poly-phase AC electric motor using kinetic energy of the vehicle at the time of a braking operation of the vehicle, and for controlling a voltage across said first and second neutral points in accordance with the calculated surplus power.

9. A power control method for a power system, wherein said power system includes
a first poly-phase AC electric motor including a star-connected first poly-phase winding as a stator winding,
a second poly-phase AC electric motor including a star-connected second poly-phase winding as a stator winding,
an electric storage charged by regenerative power generated by at least one of said first and second poly-phase AC electric motors,
an electric load electrically connected between a first neutral point of said first poly-phase winding and a second neutral point of said second poly-phase winding, and
first and second inverters respectively connected to said first and second poly-phase windings, and generating a voltage difference in accordance with a command voltage value across said first and second neutral points;
said power control method comprising:
a first step of calculating surplus power corresponding to remainder obtained by subtracting power charged in said electric storage from said regenerative power; and
a second step of calculating said command voltage value based on the calculated surplus voltage.

10. The power control method according to claim 9, wherein
said power system is mounted on a vehicle,
in said first step, the surplus power corresponding to remainder obtained by subtracting power charged in said electric storage from said regenerative power generated by at least one of said first and second poly-phase AC electric motors using kinetic energy of said vehicle at the time of a braking operation of said vehicle is calculated.

11. The power control method according to claim 10, further comprising
a third step of calculating said regenerative power based on rotation number and reduction torque of the poly-phase AC electric motor performing regeneration using kinetic energy of the vehicle.

12. The power control method according to claim 11, wherein
in said first step, said surplus power is calculated based on power difference between the regenerative power calculated in said third step and maximum charge power acceptable by said electric storage.

13. The power control method according to claim 9, wherein
in said second step, said command voltage value is calculated based on the surplus power calculated in said first step and a resistance value of said electric load.

14. The power control method according to claim 9, wherein
said power system further includes
a connecting unit electrically connecting said first and second neutral points to said electric load in accordance with a given command;
said control method further comprising
a fourth step of outputting said command to said connecting unit when said surplus power is generated.

15. A power control apparatus, comprising:
a first poly-phase AC electric motor including a star-connected first poly-phase winding as a stator winding;
a second poly-phase AC electric motor including a star-connected second poly-phase winding as a stator winding;
an electric storage charged by regenerative power generated by at least one of said first and second poly-phase AC electric motors;
an electric load electrically connected between a first neutral point of said first poly-phase winding and a second neutral point of said second poly-phase winding;
first and second inverters respectively connected to said first and second poly-phase windings; and
a controller executing a series of operations; wherein
said controller calculates surplus power corresponding to remainder obtained by subtracting power charged in said electric storage from said regenerative power; generates a command voltage value for generating a voltage difference across said first and second neutral points based on the calculated surplus power; and controls said first and second inverters such that a voltage difference in accordance with said command voltage value is generated across said first and second neutral points.

16. The power control apparatus according to claim 15, wherein
the power control apparatus is mounted on a vehicle,
said controller calculates the surplus power corresponding to remainder obtained by subtracting power charged in said electric storage from said regenerative power generated by at least one of said first and second poly-phase AC electric motors using kinetic energy of said vehicle at the time of a braking operation of said vehicle.

17. The power control apparatus according to claim 16, wherein
said controller calculates said regenerative power based on rotation number and reduction torque of the poly-phase AC electric motor performing regeneration using kinetic energy of the vehicle.

18. The power control apparatus according to claim 17, wherein
said controller calculates said surplus power based on power difference between said calculated regenerative power and maximum charge power acceptable by said electric storage.

19. The power control apparatus according to claim 15, wherein
said controller calculates said command voltage value based on said calculated surplus power and a resistance value of said resistance.

20. The power control apparatus according to claim 15, further comprising
a connecting unit arranged between said electric load and said first and second neutral points, electrically connecting said first and second neutral points to said electric load in accordance with a command from said controller; wherein
said controller outputs said command to said connecting unit when said surplus power is generated.

* * * * *